March 6, 1956  P. D. BECKER  2,737,222
RESILIENT DETENT STUD AND SOCKET FASTENER ASSEMBLY
Filed June 7, 1952
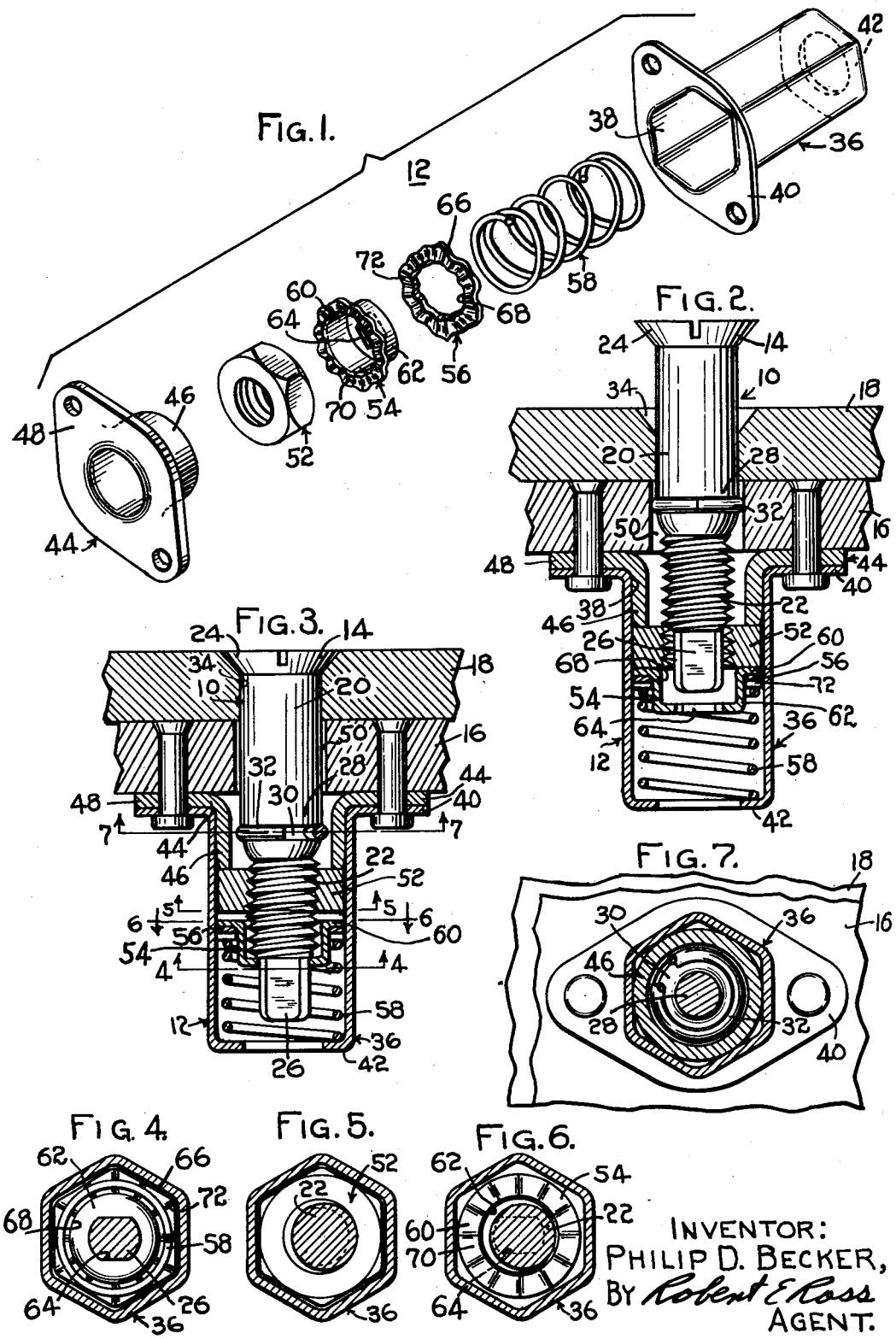
INVENTOR:
PHILIP D. BECKER,
BY Robert E Ross
AGENT.

United States Patent Office 2,737,222
Patented Mar. 6, 1956

2,737,222

RESILIENT DETENT STUD AND SOCKET FASTENER ASSEMBLY

Philip D. Becker, Hingham, Mass., assignor, by mesne assignments, to United-Carr Fastener Corporation, Boston, Mass., a corporation of Delaware Application June 7, 1952, Serial No. 292,375

1 Claim. (Cl. 151—41.5)

This invention relates generally to fastening devices, and has particular reference to a high strength panel fastener for securing superimposed panels of aircraft or the like.

In the construction of aircraft for travel at extremely high speeds, it has been found desirable to design the airframe so that the outer sheet metal covering provides part of the structural strength thereof. Such sheet metal covering must necessarily be provided with panels to allow access to apparatus inside the airframe, and the panels must be capable of being rapidly removed and replaced. However, since the panels, when in place, provide a portion of the structural strength of the airframe, the fastening means used must be exceedingly strong and reliable. This is particularly true in the case of aircraft designed to operate at speeds approaching or exceeding the speed of sound, since at such speeds considerable shear stress may be produced between the panel and the main body of the airframe. In such aircraft, the sheet metal covering and the panels are formed of relatively thick metal, resulting in an exceedingly stiff structure. Consequently a fastener for attaching such panels must have the sufficient strength to pull the stiff panels tightly together, and must be designed to have a relatively large amount of tolerance to enable it to pull slightly misformed panels into place, and to accommodate panels having variations in thickness, and it is the object of this invention to provide an improved fastener which satisfies these requirements.

In the drawing:

Fig. 1 is an exploded view in perspective of the component parts of a socket member of the fastener of the invention;

Fig. 2 is a view in section of the socket member of Fig. 1 attached to a panel, and a stud member assembled with a superimposed panel in position for assembly into the socket;

Fig. 3 is a view similar to Fig. 2 in which the stud member has been assembled with the socket member;

Fig. 4 is a view in section taken on line 4—4 Fig. 3;

Fig. 5 is a view in section taken on line 5—5 of Fig. 3;

Fig. 6 is a view in section taken on line 6—6 of Fig. 3; and

Fig. 7 is a view in section taken on line 7—7 of Fig. 3.

Referring to the drawing, there is illustrated a panel fastener 10, comprising a socket 12 and a stud 14 for assembly with panels 16 and 18 respectively, to enable the panels to be secured together in superimposed relation.

The stud 14 comprises generally a bolt 20 having a threaded shank portion 22, a head 24 disposed on one end thereof, and a smaller non-circular end portion 26 disposed on the other end. An unthreaded portion 28 of the shank may be provided with a peripheral groove 30, with a split ring retaining member 32 disposed in the groove. The bolt 20 may be assembled with the panel 18 by inserting the bolt through an opening 34 and then assembling the retaining ring 32 onto the end of the bolt and into the groove 30. The dimensions of the ring in relation to the size of the opening 34 are such that it is impossible to pull the bolt having the ring assembled thereon through the opening. For a reason to appear hereinafter, the groove 30 is sufficiently deep that the spring can pass completely into the groove on any side of the bolt.

The socket 12 comprises generally a hollow sheet metal housing 36, which in the illustrated embodiment is hexagonal in cross section, and is provided with an open end 38 having a mounting flange 40 disposed thereon, and an opposite end 42 which is substantially closed. A bearing member 44 is assembled into the open end of the housing, which comprises a tubular portion 46 projecting into the end of the housing, and a peripheral flange portion 48 seated on the mounting flange 40. Both flanges may be provided with apertures to enable the socket assembly to be attached to the panel 16 by rivets or other means in the usual manner, so as to be opposite an opening 50 therein. The opening 50 is sufficiently large to allow the bolt and the retaining ring to pass freely therethrough.

To provide means for engagement with the threaded shank of the bolt 20, a nut 52 is provided in the housing, and the nut is provided with a hexagonal periphery to conform to the shape of the housing so that the nut is non-rotatable therein. To maintain the nut against the bearing member, in position for receiving the bolt, and to impart a friction lock feature to the socket, friction plates 54 and 56, and a spring 58 are provided in the housing between the nut and the end 42 of the housing. The upper plate 54 comprises a substantially circular peripheral flange portion 60, and a central cup-shaped portion 62 having a non-circular opening 64 disposed centrally therein, which corresponds generally to the shape of the non-circular end portion 26 of the bolt for a purpose to be hereinafter described. The lower plate 56 is provided with a generally hexagonal periphery 66 so as to be non-rotatable in the housing, and has a central aperture 68 sufficiently large to receive the cup-shaped portion 62 of the upper plate. The spring 58 is disposed between the lower plate and the end 42 of the housing, and in the normal condition illustrated in Fig. 2, the spring is sufficiently pre-compressed to maintain the nut against the bearing member 44.

When the panel 18 is superimposed on the panel 16, so that the bolt 20 enters the opening 50, the threaded portion of the shank seats on the threads of the nut in position to be screwed therein. The bolt 20 is movable axially in its opening 34 so that the bolt may move upwardly in its opening and thereby allow the panels to come together before the bolt is screwed into the nut. The bolt may then be screwed into the nut, and as the end portion 26 advances downwardly, it contacts the bottom of the central cup-shaped portion 62 of the upper plate 54, and forces it downwardly a short distance against the compression of the spring 58, until the continued rotation of the bolt aligns the non-circular end portion 26 with the non-circular opening 64 in the bottom of the cup-shaped portion 62. The end portion 26 is then free to enter the opening 64, and thereafter the upper plate 54 rotates with the bolt and continues to move downwardly, causing further compression of the spring 58. Since the lower plate 56 is being forced against the upper plate by the spring, and since the lower plate is non-rotatable in the housing, rotation of the bolt causes the upper plate to rotate while bearing against the lower plate so that frictional forces are developed therebetween, tending to resist such rotation in either direction. When the bolt is tightened into the nut as far as possible so that the panels are held tightly together (see Fig. 3), the nut will be pulled tightly against the tubular portion 46 of the bearing member 44, and the plates will be held together between the spring and the end of the threaded portion of the bolt. Hence, vibration tending to cause the nut to loosen in the bolt will be resisted by the frictional engagement between the two plates. If it is desired to increase the frictional engagement between the plates 54 and 56, each plate may be provided with a series of embossed detents 70 and 72 respectively, which are adapted to seat together to provide a ratchet-like action during operation of the device.

To disassemble the stud and socket, the bolt is turned so as to unscrew it from the nut, until the threaded portion of the shank clears the bolt, after which the panels may be separated. In the case of slight misalignment of the panels, so that the side of the bolt bears against the lower panel at one side of the opening 50, the separation of the panels will not be impeded by the retaining ring, since the groove 30 in which the ring is seated is sufficiently deep to allow the ring to pass into the groove far enough so as not to protrude beyond the surface of the bolt to interfere with the withdrawal of the bolt from the panel 16.

The device has certain other advantages which will be readily apparent to those familiar with the practical problems involved in aircraft fastener installations. For example, the strength of the fastener in shear is very great, since the solid bolt extends through both panels. The strength is also great in tension, and is limited only by the strength of the threads of the nut and the bolt. A relatively great force may be applied to the panel by the tightening of the bolt into the nut, which not only provides a secure assembly, but also enables a great force to be applied to the panels to draw them together in cases where one panel is slightly deformed. Bolts of various lengths may be used with the same socket, thereby increasing the versatility of the fastener in accommodating panels of various thicknesses, and in providing a great amount of tolerance to allow the bolt and nut to engage when the panels are deformed. The design of the fastener also allows the panels to come completely together before engagement of the stud with the socket has occurred, and one fastener on a panel may be completely tightened before others on the same panel are engaged. This latter feature is of great importance where a relatively large panel is provided with a series of fasteners about the edge. It will also be noted that when the stud and socket are in position for assembly, as in Fig. 2, the stud is effectively spring loaded against downward forces, so that if a strong downward push is applied to the head of the stud in this position, either intentionally by a mechanic during assembly, or unintentionally by an object falling onto the stud, the force is absorbed by the spring 58 without damage to the socket. Another important feature of the device is that the friction lock mechanism is completely independent of the tension and shear resisting parts of the device, so that extreme stresses will not affect the ability of the plates to lock the bolt against rotation due to vibration.

Although in the illustrated embodiment, the nut and the housing are hexagonal, other shapes may, of course, be used, so long as the nut is non-rotatable in the housing. Other methods of retaining the bolt in the panel 18 may be used instead of the method illustrated. Another suitable method is disclosed in applicant's co-pending application, filed June 27, 1951, Serial No. 233,910, entitled "Fastening Device."

Since certain other obvious modifications may be made in the device without departing from the scope of the invention, it is intended that all matter contained herein be interpreted in an illustrative and not a limiting sense.

I claim:

A panel fastener, comprising a stud for assembly into an opening in one panel and a socket for assembly onto a second panel opposite an opening therein, said stud comprising a shank having a threaded portion and a smaller non-circular end portion extending therefrom, said socket comprising a hollow receptacle having a non-circular imperforate wall and an opening at one end to receive a stud and laterally extending mounting flanges at said end, a nut non-rotatably disposed in said receptacle and movable longitudinally therein, a nut stop member assembled onto said one end of the receptacle, said nut stop member having laterally extending flange means resting on the mounting flanges and means extending a predetermined distance into the receptacle to abut the upper face of the nut and limit its movement toward the said one end of the receptacle, friction lock means disposed in the receptacle on the side of the nut opposite said stud-receiving opening, said friction lock means comprising a pair of relatively rotatable plates having interengaging detent portions, one of said plates having means engaging the wall of the receptacle so as to be non-rotatable therein, the other plate having a medial opening shaped to receive the non-circular end of the stud so as to be non-rotatable thereon, and spring means disposed between the friction lock means and the bottom of the receptacle, said spring means biasing the friction lock assembly and the nut toward said one end of the receptacle.

References Cited in the file of this patent

UNITED STATES PATENTS

| | | |
|---|---|---|
| 989,450 | Turner | Apr. 11, 1911 |
| 2,281,455 | Powell | Apr. 28, 1942 |

FOREIGN PATENTS

| | | |
|---|---|---|
| 564,108 | Great Britain | Sept. 13, 1944 |